United States Patent
Ihringer et al.

(10) Patent No.: US 7,632,586 B2
(45) Date of Patent: Dec. 15, 2009

(54) SOLID OXIDE FUEL CELL POSITIVE ELECTRODE—ELECTROLYTE—NEGATIVE ELECTRODE

(75) Inventors: Raphael Ihringer, Lausanne (CH); Alexandre Closset, Genève (CH); Joseph Sfeir, Reiden (CH); Olivier Franz Bucheli, Lausanne (CH)

(73) Assignee: HTceramix S.A., Lausanne (CH)

( * ) Notice: Subject to any disclaimer, the term of this patent is extended or adjusted under 35 U.S.C. 154(b) by 473 days.

(21) Appl. No.: 10/500,515

(22) PCT Filed: Jan. 9, 2003

(86) PCT No.: PCT/CH03/00008

§ 371 (c)(1),
(2), (4) Date: Jun. 30, 2004

(87) PCT Pub. No.: WO03/058744

PCT Pub. Date: Jul. 17, 2003

(65) Prior Publication Data

US 2005/0048356 A1    Mar. 3, 2005

(30) Foreign Application Priority Data

Jan. 9, 2002    (EP) ................... 02405007

(51) Int. Cl.
H01M 4/86    (2006.01)
H01M 4/90    (2006.01)
H01M 8/12    (2006.01)
(52) U.S. Cl. ......................... 429/30; 429/44
(58) Field of Classification Search .................. 429/30, 429/44
See application file for complete search history.

(56) References Cited

U.S. PATENT DOCUMENTS

| 5,230,849 | A | 7/1993 | Hsu |
| 5,256,499 | A | 10/1993 | Minh et al. |
| 6,214,485 | B1 * | 4/2001 | Barnett et al. ................ 429/13 |
| 7,074,513 | B2 * | 7/2006 | Shibata et al. ............... 429/38 |

FOREIGN PATENT DOCUMENTS

| EP | 0 572 017 A1 | 5/1993 |
| JP | 01197971 A | * 8/1989 |
| JP | 02239568 A | * 9/1990 |

(Continued)

OTHER PUBLICATIONS

Ihringer, Raphael et al; Development of thin film electronlytes co-fired with NIO-YSZ sustrates; Electrochemical Proceedings, vol. 97-18, pp. 340-347.

(Continued)

*Primary Examiner*—Gregg Cantelmo
(74) *Attorney, Agent, or Firm*—Clifford W. Browning; Krieg DeVault LLP (57) ABSTRACT

Disclosed is a solid oxide fuel cell (SOFC) positive electrolyte negative (PEN) comprising electrodes on the rear side thereof used for establishing contact between a flat interconnecting plate and a raised structure which is configured in such a way that it forms gas circulation channels with said plate. The PEN and interconnecting plates can have holes so as to create internal gas inlet and outlet tubes. The electrolyte/electrode interface can also be configured as a raised structure increasing the ratio of the extended area to the projected area.

32 Claims, 5 Drawing Sheets

FOREIGN PATENT DOCUMENTS

| | | | |
|---|---|---|---|
| JP | 03 134964 | A | 6/1991 |
| JP | 04 079163 | A | 3/1992 |
| JP | 04 169071 | A | 6/1992 |
| JP | 08 078040 | A | 3/1996 |
| JP | 08078040 | A * | 3/1996 |
| JP | 08 264198 | A | 10/1996 |
| WO | WO 00/69008 | | 11/2000 |
| WO | WO 00/77872 | | 12/2000 |
| WO | WO 01 41239 | A | 6/2001 |
| WO | WO 01/41239 | A1 | 6/2001 |
| WO | WO 01 57945 | A | 8/2001 |
| WO | WO 01/57945 | A1 | 8/2001 |
| WO | WO 01 67534 | A | 9/2001 |
| WO | WO 01/67534 | A1 | 9/2001 |

OTHER PUBLICATIONS

McEvoy, A.J. et al; ASPEN-Anode Supported Positive-Electrolyte-Negative (PEN); IEA, Tokyo, May 2001.

Anode Supported PEN for SOFC (Solid Oxide Fuel Cell); yearly report, 2000 Offen, Office Federal de l'energie, Switzerland.

Anode Supported PEN for SOFC; yearly report, 2001 Offen, Office Federal de l'energie, Switzerland.

Database EPO: Patent Abstract of Japan, vol. 015, No. 348 (E1107), Sep. 4, 1991 & JP 03 134964 (Fuji Electric Co., Ltd.), Jun. 7, 1991.

Database EPO: Patent Abstract of Japan, vol. 016, No. 472 (E1272), Sep. 30, 1992 & JP 04 169071 (Fuji Electric Co., Ltd.), Jun. 17, 1992.

Database EPO: Patent Abstract of Japan, vol. 016, No. 294 (E1225), Jun. 29, 1992 & JP 04 079163 (Fuji Electric Co., Ltd.), Mar. 12, 1992.

Database EPO: Patent Abstract of Japan, vol. 1997, No. 02, Feb. 28, 1997, & JP 08 264198 (NGK Insulators Ltd), Oct. 10, 1996.

Database EPO: Patent Abstract of Japan, vol. 1996, No. 07, Jul. 31, 1996; & JP 08 078040 (Mitsubishi Heavy Ind Ltd), Mar. 22, 1996.

ESP@cENET; JP 4126365 (Ishikawajima Harima Heavy Ind), Apr. 27, 1992.

* cited by examiner

Fuel or air

SOLID OXIDE FUEL CELL POSITIVE ELECTRODE—ELECTROLYTE—NEGATIVE ELECTRODE

FIELD OF THE INVENTION

The present invention relates to the field of solid oxide fuel cells which are commonly referred to as SOFCs.

BACKGROUND OF THE INVENTION AND PRIOR ART

A fuel cell has an anode and a cathode which are separated by an electrolyte that transports the ions but does not conduct the electrons. The cathode-electrolyte-anode assembly is commonly referred to as a PEN (Positive electrode-Electrolyte-Negative electrode). The electrolyte consists of a metal oxide in solid, non-porous form, for example a zirconium oxide, which is capable of transporting oxygen anions. The anode, which is porous, is the place where a gaseous fuel, generally hydrogen, or even an organic fuel (methanol, light fuel, natural gas) with the hydrogen being extracted therefrom by reforming, undergoes an oxidation reaction. The oxygen of the air undergoes a reduction reaction at the cathode, which is porous. The reaction is continuous by virtue of the continuous supply of fuel gases and oxidizing gases, produces two electrons per hydrogen molecule and delivers a potential of around 0.6 to 1.2 V, as well as heat. It is necessary to associate several SOFCs in series in order to obtain a higher output voltage. In the planar SOFC concept, a "stack" is formed, each unit of which comprises one or more ceramic and/or metal plates having a thickness of from a few tenths of a millimeter to a few millimeters, integrating all the electrochemically active components of the PEN, and an interconnecting plate which is sometimes referred to as a dipolar plate.

In particular, the invention relates to an SOFC PEN with a cathode, said cathode comprising a porous cathode layer and an active cathode layer, with an anode, said anode comprising an active anode layer and a porous anode support layer, said anode support layer constituting the mechanical support of the PEN, and with at least one non-porous electrolyte layer, said electrolyte layer being placed between said active anode and cathode layers.

The document "Status of the Sulzer Hexis solid oxide fuel cell (SOFC) system development", R. Diethelm et al., Third European Solid Oxide Fuel Cell Forum, P. Stevensed., Nantes, June 1998, p. 87-93, describes an SOFC developed by the company Sulzer Hexis (CH). The fuel gases and oxidizing gases are supplied to the electrodes by an interconnecting plate consisting of a chromium-rich metal alloy disk (94% Cr, 5% Fe, 1% $Y_2O_3$), pierced by a central hole and structured by machining on its two faces, the latter alternately having openings toward the outside and toward the central hole. In a stack of this type, the fuel circulates in the central tube and is then diffused toward the anode face of each cell by virtue of the openings left by the structure of the interconnecting plate. The fuel cannot penetrate toward the cathode side since the interconnecting plate covers the entire inner edge of the cathode over a width of a few millimeters. The air is injected from the outside through holes which are made in the interconnecting plates and vertically aligned, which makes it possible to guide the air through U-shaped profiles that are pressed against the stack. The air passes through an internal cavity of the interconnecting plate, which makes it possible to heat it by means of the heat given off by the cells. The air then passes over the structured face of the interconnecting plate, opposite the cathode. On the cathode side of the interconnecting plate, a thin ceramic layer is deposited by VPS (Vacuum Plasma Spraying) so as to prevent the evaporation of chromium in the form of $CrO_3$. The external diameter of the interconnecting plates of the PENs is about 120 mm and that of the inner hole is 22 mm. A stack comprises about 70 cells and has a height of about 50 cm; the electrical power produced is 1 kW under 40 V. The interconnecting plates of this type of stack are complicated to produce and are expensive. The power and electrical voltage delivered by this device are a function respectively of the surface area and the number of cells, and hence of the surface area and number of interconnecting plates, the cost of which forms an obstacle to the profitability of the electrical energy produced by this type of device.

Documents JP 04 169071 and JP 04 079163 describe an interconnecting device that can be arranged between two PENs, this device differing from that of the Sulzer cell in that it is made in three parts: a planar central plate bears on each side a layer made of electrode materials in which channels are made for the circulation of the gases. The additional electrical resistance due to the contact between this layer and the electrode itself which lies opposite it is high, although it may be reduced by an additional interface made of conductive material.

The document JP 03 134964 also describes an interconnecting device consisting of three ceramic layers, one of which bears channels for the circulation of gas. Moreover, the PEN is borne by a plate-substrate, which on the side opposite the PEN has channels for the circulation of the other gas.

U.S. Pat. No. 5,256,499 (Allied Signal Aerospace) describes an SOFC stack consisting of a stack of ceramic plates which are pierced with several holes, these holes being arranged near the edges of the plates; the arrangement of the holes opposite one other forms lateral tubes for the supply and evacuation of the fuel and oxidizing gases, the active elements of the PENs being arranged in the central part. Each cell consists of a plate forming the electrolyte, surrounded on each side by at least one plate forming respectively the anode and the cathode, as well as of two plates pierced with holes having the dimensions of the anode and cathode and the same thickness as these two electrodes, surrounding the latter so as to form a tube section. This PEN is sandwiched between two planar interconnecting plates. Each electrode is itself formed either of a plate bearing channels or bumps or of the assembly of a planar plate and a wavy plate. The interconnecting plates of this device are simpler and less expensive than the plates of the Sulzer device mentioned above, but each cell requires two additional elements surrounding the electrodes so as to form the tubes. These elements, which are almost completely hollow, are fragile and it is difficult to seal between the electrodes and these elements. The structure forming the channels is sintered on the electrolyte, which means that it is not possible to compensate the planarity defects of the cell. Moreover, in this device, the plate constituting the electrolyte forms the mechanical support of the PEN. It must therefore be relatively thick and consequently has a relatively high ohmic resistance. In order to increase the efficiency of an SOFC, the ohmic resistance has to be reduced as far as possible by using an electrolyte of small thickness, something which is not possible with structures where the electrolyte forms the support.

In order to reduce the ohmic resistance of an SOFC, the document WO 00/69008 proposes the use of a relatively thick porous anode as the mechanical support of the PEN and to deposit an electrolyte in a thin layer (10 to 40 µm) and also a relatively fine counter-electrode on this anode support. However, this PEN requires interconnecting plates with a complex structure comprising the supply and evacuation tubes for the gases, and are thus quite thick, in order to form a stack. This structure is therefore disadvantageous on account of its thickness and the cost of the interconnecting plates.

Patent application WO 01/67534 describes an anode consisting of a multitude of discrete ceramic columns between which a gas can circulate, said columns being located between a fine layer of electrolyte and a metal interconnecting plate which is likewise fine. On the cathode side, the electrolyte is likewise separated from the interconnecting plate by a structure formed of a multitude of discrete columns allowing gas to pass between them. The structures consisting of the columns are produced by stamping the individual columns into a strip of raw ceramic and fixing these columns to a sheet of paper, which allows them to be handled. The sheet burns and disappears the first time the stack is used after assembly. This device makes it possible to use planar interconnecting plates which are therefore inexpensive. However, the column structure is complicated to produce, and handling of the components of the cell during assembly is delicate. Finally, it requires an additional sealed system for the supply and evacuation of the gases.

The document JP 08 078040 also describes a system of discrete ceramic columns which are stuck on each side of a planar PEN, providing the electrical connection to the interconnecting plates and allowing the gases to pass. This device has the advantages and drawbacks mentioned above in respect of the document WO 01/67534.

The document JP 06 068885 also describes a system of columns, in an arrangement similar to that of the previous document mentioned. The electrolyte plates and the interconnecting plates constitute the mechanical supports of this system, the electrodes being very fine electrodes which are printed onto each face of the electrolyte plate, which in turn must therefore be thick, thereby increasing the ohmic resistance.

Patent application WO 01/41239 also describes a system of channels formed by a multitude of discrete columns which allow gas to pass between them. The structures formed by the columns may be produced by locally depositing, over a thickness of 0.05 to 0.4 mm, materials that constitute electrodes on the two faces of a planar interconnecting plate, using a printing method. The columns thus form the electrodes. The interconnecting plate and the electrolyte plate each have at least one pair of holes in their central zones, each of the holes being surrounded alternately, on each face of the interconnecting plate, by a seal. The holes of the interconnecting plate and of the electrolyte plate come into alignment for the supply of gases, the latter flowing radially toward the edges of the plates between the columns. The interconnecting plate bearing the column electrodes is inexpensive to produce. However, handling of the electrolyte plate (0.2 to 0.4 mm thick) during stacking is delicate. In this system, like in the one described in WO 01/67534, the surface area of the electrodes is the total front surface area of the columns, that is to say only a fraction of the surface area of the plates. The ohmic resistance of the PEN is therefore greater than that of a PEN of the same composition having its electrodes in contact with the entire surface area of the electrolyte.

The document WO 01/41239 also proposes making systems of channels by producing them, mechanically or chemically, in the surfaces of the interconnecting plate or electrodes. This variant is expensive to implement, as in the case of the Sulzer interconnecting plates described above.

The aim of the present invention is to propose an SOFC PEN which makes it possible to produce a stack that does not have the drawbacks of the devices of the prior art. The invention is aimed in particular at producing stacks that can use, to interconnect the SOFCs, simple and inexpensive fine metal plates. It is also aimed at producing SOFCs, the ohmic resistance of which is as low as possible. It is also aimed at limiting the size in terms of thickness of an SOFC. It is also aimed at increasing the electrical power available per unit of surface area. It is finally aimed at producing a PEN together with its interconnection system, which is easy to manufacture and easy to handle during building of the stack.

SUMMARY OF THE INVENTION

The above aims are achieved by virtue of a PEN of the type defined in the introduction, in which the anode comprises an anode collector layer which covers the rear face of the anode support layer, that is to say on the opposite side from the active anode layer, and in which the anode collector layer has, on its rear face which is designed to come into contact with an interconnecting plate, a raised structure which is chosen so as to be able to form gas circulation channels with a planar plate.

For ease of language, in the text which follows the terms "front" face and "anterior" structure of an electrode layer of a PEN will refer respectively to its face or structure which is oriented toward the electrolyte, and the term "rear" face will refer to its opposite face, that is to say the face oriented toward an interconnecting plate.

A PEN according to the invention therefore allows the use of an interconnecting plate which is formed by a simple plate which is planar and smooth on the anode side. Moreover, since the mechanical support of the PEN is formed by the anode support layer, during assembly of the electrolyte between the two electrodes it is possible to reduce this electrolyte to a thin layer of a few μm, having a low ohmic resistance.

Preferably, the cathode also has, on its rear face which is designed to come into contact with an interconnecting plate, a raised structure which is chosen so as to form gas circulation channels with said interconnecting plate, In particular, the raised structures of the anode and of the cathode may each comprise a plurality of prominent bumps which are spaced apart from one another, the summit surfaces of the bumps of the anode being substantially coplanar and parallel to the summit surfaces of the bumps of the cathode, the latter likewise being coplanar with one another. These structures may likewise comprise sealing edgings having a thickness that is the same as the height of the bumps over the perimeter of the rear faces of the electrodes.

The entire structure of the PEN is thus contained between two parallel planes. In order to create a stack, all that is required is to stack PENs of this type and planar metal plates in an alternating manner.

The gases may advantageously be supplied by means of at least one first hole and at least one second hole passing axially through the PEN, that is to say in the axis of the stack, the raised structure of the rear face of the anode comprising at least one first lip that surrounds said first hole, the raised structure of the rear face of the cathode comprising at least one second lip that surrounds said second hole, said first hole not being surrounded by a said second lip and said second hole not being surrounded by a said first lip.

The lips act as seals and provide quasi-sealing. In the stack, the holes which lie opposite one another form a tube parallel to the axis of the stack, and the presence or absence of a lip around each hole conditions the diffusion of one of the gases exclusively onto the rear face of the cathode and of the other gas exclusively onto the rear face of the anode.

According to one embodiment, the raised structures of the respective rear faces of the cathode and anode each comprise an edging that surrounds each rear face, each capable of forming, in collaboration with an interconnecting plate, a chamber that is sealed except on an open portion of said edging. The two open portions, seen in the direction of the stacking axis of the SOFC, have no overlapping zone. These open zones communicate with lateral gas supply and evacuation tubes.

According to another preferred embodiment, the raised structures of the rear faces of the two electrodes are completely surrounded by a sealed edging and the plates forming the stack have at least two circulation holes for each gas, namely one inlet hole and one outlet hole, that is to say at least four holes in total. The latter form a set of tubes within the stack of cells, which means that it is no longer necessary to have lateral evacuation tubes and thus lowers the manufacturing cost.

Advantageously, the front face of the anode on the electrolyte side, which makes contact with this electrolyte, also has a raised structure. Such a front face has a developed surface area that is greater than the surface area projecting in the stacking axis. The reactive surface area is therefore considerably increased without significantly increasing the size of the device as a whole.

According to one preferred embodiment, the anode support layer has a raised structure on its front face. The active anode layer, the electrolyte and the cathode assembly may consist of thin layers which cover said raised structure of the front face of the anode support layer, and this raised structure is chosen so that the rear face of the cathode can form gas circulation channels with a planar interconnecting plate with which it comes into contact.

In this embodiment, the raised structure of the front face of the anode therefore has a dual function: on the one hand it increases the reactive surface area of the PEN and on the other hand the raised areas of this surface, not being attenuated or being only slightly attenuated by the thin layers which cover the anode support layer, produce the shape of the gas circulation channels on the cathode side. In this embodiment, the structure of the front face of the anode support layer may be obtained by a molding process whereas the thin layers of the electrolyte and of the cathode may be obtained by a deposition process. This raised structure of the front face of the anode may in particular consist of a plurality of bumps having a height of between 0.2 and 2 mm, the distance between the flanks of neighboring bumps being between 0.1 and 2 mm.

According to another embodiment of a PEN in which the anode support layer has an anterior raised structure on its front face, the active anode layer, the electrolyte and the active cathode layer consist of thin layers. The porous cathode layer which covers them and which fully or partially levels out the raised areas behind the active cathode layer has, on its rear face which is designed to come into contact with an interconnecting plate, a second raised structure which is chosen so as to form gas circulation channels with said interconnecting plate. In this embodiment, the anterior raised structure of the front face of the anode support layer and the raised structure of the rear face of the porous cathode layer may be chosen with different configurations, the raised areas of the structure of the rear face of the cathode having to be sufficient to form gas circulation channels whereas the front face of the anode may exhibit only a microstructuring designed to increase its reactive surface area. This anterior raised structure of the front face of the anode support layer may be obtained by stamping or by micromolding, in particular a micromolding processing involving gelling or "gel casting" of the raw material. The height of the raised elements forming the raised structure may be from 0.1 to 2 mm. The distance between neighboring elements may be between 50 µm and 2 mm. The ratio between the height and the thickness of these elements may be between 1 and 4.

In order to obtain an anode having on the one hand a first raised structure on its rear face and on the other hand an anterior raised structure on its front face, it is possible to join two layers, each having one smooth face and one structured face, by their smooth faces. The joining may be carried out when the two layers are in the raw state. The layer forming the gas distribution channels and the current collection may be deposited on the anode support layer produced beforehand by sintering.

It is thus possible to join an anode support layer to an anode collector layer. It is also possible to join two half-layers, joining of which produces the anode support layer.

An anode support layer which is structured on both its faces may also be produced by direct molding, for example by injection molding.

One common property that is desired for the materials of an SOFC cell is their ability to not be modified over time at the operating temperature of the cell (700-1000° C.) in their respective—oxidizing or reducing—environments.

The materials used to form the cathode, in particular the porous cathode layer, often comprise a perovskite structure, such as strontium-doped lanthanum manganates (LSM). Compositions such as lanthanum cobaltates or ferrocobaltates exhibit greater activity than LSMs, but are liable to react with a zirconia electrolyte.

Between the porous cathode layer and the electrolyte, there may be arranged a thin (2 to 5 µm) and dense (>80%) active layer which consists for example of a mixture of $CeO_2$ or zirconia with an LSM. This choice of material makes it possible to create on the electrolyte a thin layer of a material which is a hybrid conductor, of ions and electrons.

The electrolyte is a dense material with high ion conductivity, but zero or very low electron conductivity. The material that is most commonly used is zirconia which is stabilized, for example with 8 mol % of $Y_2O_3$ (8 YSZ), or partially stabilized, for example with 3 mol % of $Y_2O_3$ (3 YSZ).

Composites of nickel and zirconia, commonly referred to as "cermets", are preferred materials for forming an SOFC anode. By way of example, it is possible to use a "cermet" Ni-8 YSZ with 35 to 45% by weight of nickel metal phase.

In the electrochemically active (0.5 to 5 µm) anode layer that is in contact with the electrolyte, it is possible to seek to reduce the current density in the metal phase and to increase the number of particles of the metal phase belonging to the electrically percolating network, and thus to increase the activity of the electrode, by replacing part of the ion-conductive ceramic phase, that is to say 8 YSZ, with an electron-conductive ceramic which does not reduce to metal in a hydrogen atmosphere at the operating temperature of the cell, that is to say at about 800° C. By way of example of such a conductive ceramic, mention may be made of $CeO_2$ doped with $U_2O_3$ (1 to 10%) or $Nb_2O_5$ (1 to 10%) or with 10 to 40 mol % of Gd or of Y or else $U_2O_3$ doped with $Y_2O_3$ (1 to 10%) or $TiO_2$ doped with Nb or Ta (1 to 10%).

The anode support layer is porous and consists of an electron-conductive material. In order to increase its stability, it is possible to seek to reduce the proportion of the electron-conductive phase, for example Ni, compared to the ceramic phase, for example zirconia. In order to retain sufficient electron conductivity, it is then necessary to organize the spatial distribution of the electron-conductive phase:

The electron-conductive phase may be distributed around particles of the ceramic phase having a mean diameter that is three to ten times greater than the mean thickness of the film formed by the electron-conductive phase. This structure may be obtained by spraying a dispersion of fine zirconia particles, for example $0.1<D50<0.3$ μm, in particles of larger size, for example $15<D50<30$ μm, and mixing these particles with a dispersion of fine particles, for example $0.1<D50<0.3$ μm, of the conductive phase.

It is also possible to preferably arrange the electron-conductive phase on the walls of pores formed in the structure. To do this, the electron-conductive phase, such as Ni or NiO, is deposited beforehand, for example using electroless deposition or salt precipitation, on the surface of relatively large particles, for example $5<D50<30$ μm, of a substance that can be pyrolized at between 250 and 400° C., such as particles of cellulose, carbon or starch which, after pyrolysis, allow pores to remain in the structure of the anode support layer.

It is also possible to produce, in a first step, particles having a size $2<D50<50$ μm and a density of less than or equal to 2 g/cm$^3$, containing nickel or any other transition metal (Fe, Co for example) in the form of an oxide or a salt (oxalate or carbonate for example) and, optionally, zirconia and an organic phase. They may be obtained for example by spraying a dispersion of fine particles of the materials mentioned above. These particles are then added in an amount of about 35% by volume to zirconia particles. This mixture serves as a basis for producing the anode support. During sintering of the latter, a porosity is created within the particles containing nickel. This porosity makes it possible for the nickel to reoxidize without destroying the structure of the anode support.

The anode may thus comprise, on the interconnecting plate side, a fine (1 to 10 μm) or structured collector layer, enriched with electron-conductive material, for example with nickel. This layer makes it possible to reduce the current collection ohmic losses.

The layers that make up the anode, like the layers that make up the cathode, and in particular the anode support layer, the anode collector layer and the porous cathode layer, may include fibers. The use of a composite material including fibers has many advantages:
  improvement in the dimensional stability from manufacture until use, that is to say from the raw form to the structure at operational temperature and up to the sintered form;
  improvement in the redox stability, by virtue of the choice of materials of which the fibers are formed;
  adjustment of the thermal expansion coefficients of the various layers, in particular improvement in the compatibility of the thermal expansion coefficient of the anode support with those of the other layers.

Fibers having a diameter of between 1 and 50 μm and a length/diameter ratio L/d of between 2 and 30 will advantageously be chosen. Preferably, the diameter will be between 2 and 30 μm and the ratio L/d will be between 5 and 25. Fibers having a diameter of between 5 and 15 μm and a ratio L/d of between 8 and 20 are particularly preferred.

For the cathode, in particular the porous cathode layer, it is possible to use ceramic fibers with or without electron conductivity. It is possible to use fibers of materials of LSM type, for example $La_{0.7}Sr_{0.3}MnO_3$, or of LSC type, in particular $La_{0.7}Sr_{0.3}CoO_3$.

To produce the anode, in particular the collector layer, it is possible to add from 5 to 60% by volume, preferably 20 to 40% by volume and particularly preferably 25 to 35% by volume, of ceramic or metal fibers with respect to the total volume. The material of the fibers may be chosen from $ZrO_2$, $Al_2O_3$, MgO, Ni or from ceramics that are conductive under $H_2/H_2O$, such as $TiO_2$, $TiO_2+5\%$ $NbO_{2.5}$, $CeO_2+10\%$ $NbO_{2.5}$, $Nb_2TiO_7$, $Nb_2O_5$, $SrTiO_3$, $Fe_3O_4$.

Finally, as a variant, it is possible to incorporate into the material of the anode, in place of or as well as fibers, particles of the ceramic materials mentioned above, having a diameter of between 0.1 and 50 μm and preferably between 0.3 and 30 μm. Particles having a diameter of between 0.5 and 5 μm are particularly preferred.

According to one preferred embodiment of the invention, the materials of the anode, that is to say of the anode support layer and/or in particular of the anode collector layer, may incorporate one or more catalysts, with the aim of reforming a carbon-based fuel, of allowing direct oxidation of a carbon-based fuel gas, for example $CH_4$, which may or may not be partially reformed, and/or of improving the tolerance of the SOFC to the presence of sulfur contained in the fuel. Part of the anode, which is a porous structure, thus becomes an internal reforming element, without increasing the height of the stack. This would be impossible with an interconnecting plate structured so as to produce circulation channels and made of dense steel.

As catalyst, it is possible to use Ni or an NiCu alloy on a ceramic support, such as a zirconium oxide, aluminum oxide, magnesium oxide or cerium dioxide. In the case of a nickel catalyst, the nickel represents 1 to 25% by weight of the particles, preferably 1 to 10% and more particularly 1.2 to 5%. In the case of an NiCu catalyst, the copper content is from 5 to 50%, in particular 10 to 30% and more particularly 15 to 25% of the metal phase. In the case of a catalyst using magnesium oxide MgO as support, the latter may be mixed with another oxide in order to improve its catalytic power and also the thermal expansion coefficient and the conductivity of the anode layer.

With a view to bringing about the direct oxidation of a carbon-based fuel, for example $CH_4$, which is not reformed or has already been partially reformed, it is possible to add the following catalysts to the mixture: NiCu and chromites, it being possible for the content of chromites to vary from 0 to 100% of this mixture. The optimum composition of the chromites is $La_{1-x}(Ca, Sr)_xCr_{1-y}Ni_yO_3$ with $x=0-0.15$ and $y=0-0.5$. The mixture may also comprise another conductive oxide, for example titanates or niobates having conductivities of around 300 S/cm.

In order to improve the tolerance to sulfur, it is possible to add cerium dioxide, $CeO_2$, to the catalysts in a proportion of from 5 to 100% by weight with respect to the Ni-based catalysts, preferably 10 to 50% and in particular from 15 to 25% by weight. The presence of Cu at the anode also improves the tolerance to sulfur.

This catalyst, or catalytic mixture, is mixed with the materials that make up the anode typically in a proportion of 5 to 15% by volume, while remaining below the percolation threshold so as not to disrupt current collection.

The interconnecting plate inserted between two PENs may consist of a ferritic alloy for operating temperatures of between 700 and 800° C., of a chromium-based alloy for operating temperatures of between 800 and 900° C., or of a ceramic such as a lanthanum chromite for operating temperatures of between 900 and 1000° C.

In order to improve the long-term electrical conductivity of the interconnecting plate and of the cathode/interconnecting plate interface, the surface area of the interconnecting plate, which consists for example of Fe26Cr, may be treated in accordance with the following procedure: an aqueous solution of cations (in the form of a nitrate for example) is deposited on the interconnecting plate so as to obtain after drying a layer having a thickness of a few microns. The latter is then brought to a high temperature in an atmosphere which may be reducing or otherwise. The duration of the treatment may for example be 48 hours at 1000° C. under an atmosphere of argon and hydrogen. The cations used are selected from the following family: La, Ti, Sr, Ca, Mg, Ba, Nb, Mo, Mn, Cu, Ce, Pr. A pair of cations which particularly improve the desired properties is formed by lanthanum and strontium.

The layers and assemblies of layers mentioned above may be produced using the above materials dispersed in water and/or organic solvents, to which binders, wetting agents, etc. have been added in the form of a liquid, a slurry and/or a paste. Among the techniques used, mention may be made of rolling, extrusion, strip casting, in particular co-casting, or molding, with or without gelling of the paste or suspension. The formation of one or more thin layers on a support layer, in particular an anode support layer, may be obtained by printing techniques, for example by depositing a thin layer by means of rollers on a thicker layer that has previously been obtained by a strip casting method. These techniques per se are known to the person skilled in the art and are described more particularly for example by Raphaël Ihringer et al., "Solid Oxide Fuel Cells V", U. Stimming, S. C. Singhal, H. Tagawa and W. Lehnert, Editors, PV 97-40, p. 340-347, The Electrochemical Society Proceedings Series, Pennington, N.J. (1997), or by Mark A. Janney et al., J. Am. Ceram. Soc., 81 (3) 581-91 (1998), or in thesis no. 2307 submitted in 2001 at the Ecole Polytechnique Fédérale de Lausanne. They are also illustrated by the examples given below.

BRIEF DESCRIPTION OF THE DRAWINGS

In these figures, layers having identical or similar functions and natures are denoted by the same reference numbers and/or the same abbreviations. The thicknesses of the layers are not shown to scale.

Other details of the invention will become clear to the person skilled in the art in the light of the detailed description of embodiments and examples given below.

DETAILED DESCRIPTION OF THE PREFERRED EMBODIMENTS

Figure 1:
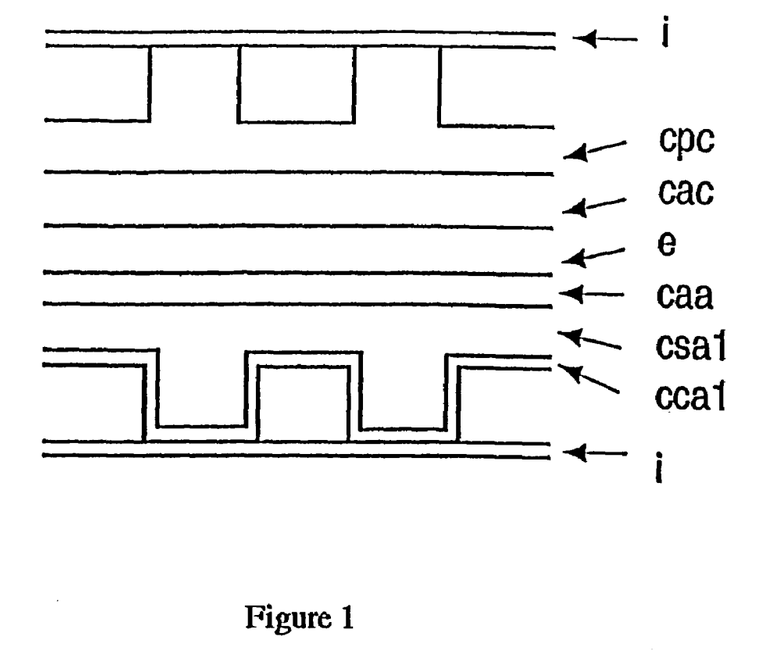
FIG. 1 is a schematic representation, in vertical section, of a first embodiment of a PEN.

FIG. 1 shows a first embodiment. It shows, from top to bottom:

a non-structured, planar, metal interconnecting plate i; its thickness may be around 0.1 to 2 mm;

a porous cathode layer, cpc, which is structured and obtained by molding, having on its rear face raised areas in the form of bumps with a height of 0.2 to 1 mm, the summit surfaces of which are in contact with the interconnecting plate i; the spaces between the bumps form gas circulation channels;

a thin active cathode layer cac; its thickness may be around 1 to 20 μm;

an electrolyte layer e; its thickness may be around 3 to 20 μm;

an active anode layer caa; its thickness may be around 1 to 20 μm;

a porous anode support layer csa1 which is structured, its thickness possibly being around 0.1 to 0.5 mm, obtained by micromolding, having on its rear face raised areas in the form of bumps with a height of around 0.2 to 1 mm;

a thin anode collector layer cca1, of around 5 to 20 μm, which is deposited on the anode support layer and covers the bumps. The summit surfaces of these bumps are in contact with a second interconnecting plate i which is identical to the upper plate and forms gas circulation channels with the latter.

Figure 2:
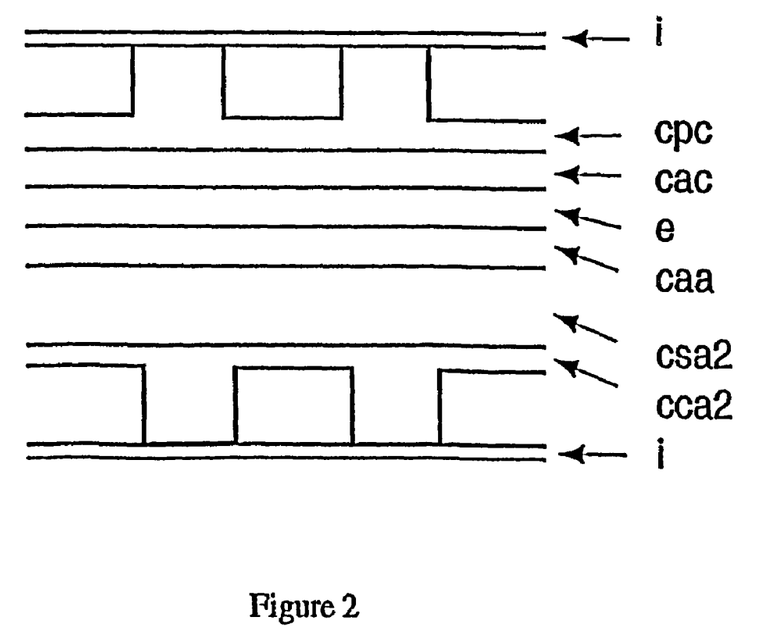
FIG. 2 is a schematic representation, in vertical section, of a second embodiment of a PEN.

FIG. 2 shows a structure which is similar with regard to the layers i, cpc, cac, e and caa. In this second embodiment, the rear face of a porous anode support layer csa2 is planar and bears a structured anode collector layer cca2 which is molded and bonded to the layer csa2. The anode collector layer cca2 has on its rear face a raised structure consisting of bumps, the summit surfaces of which come into contact with the interconnecting plate i, forming gas circulation channels with the latter. The collector layer cca2 participates in the support function.

Figure 3:
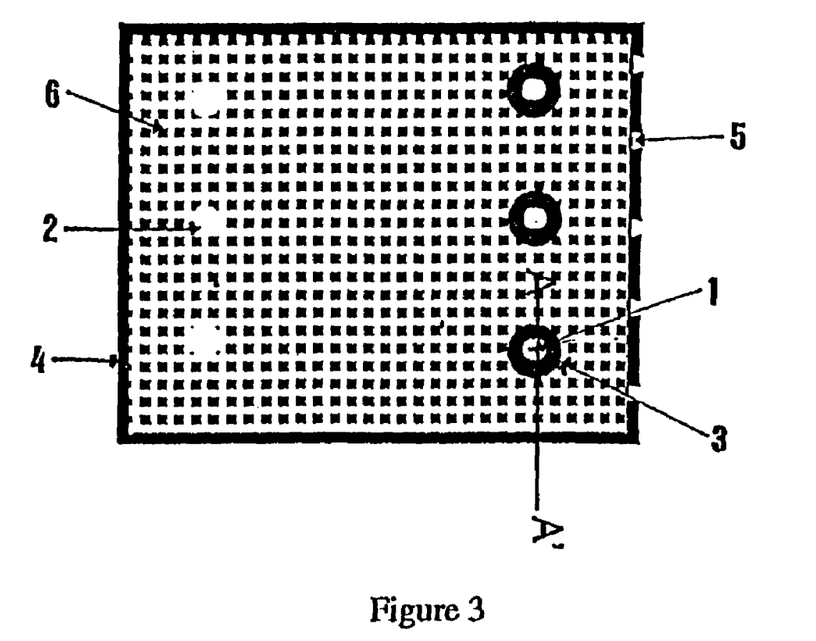
FIG. 3 is a schematic representation, in plan view, of a first embodiment of the rear face of an electrode.
Figure 4:
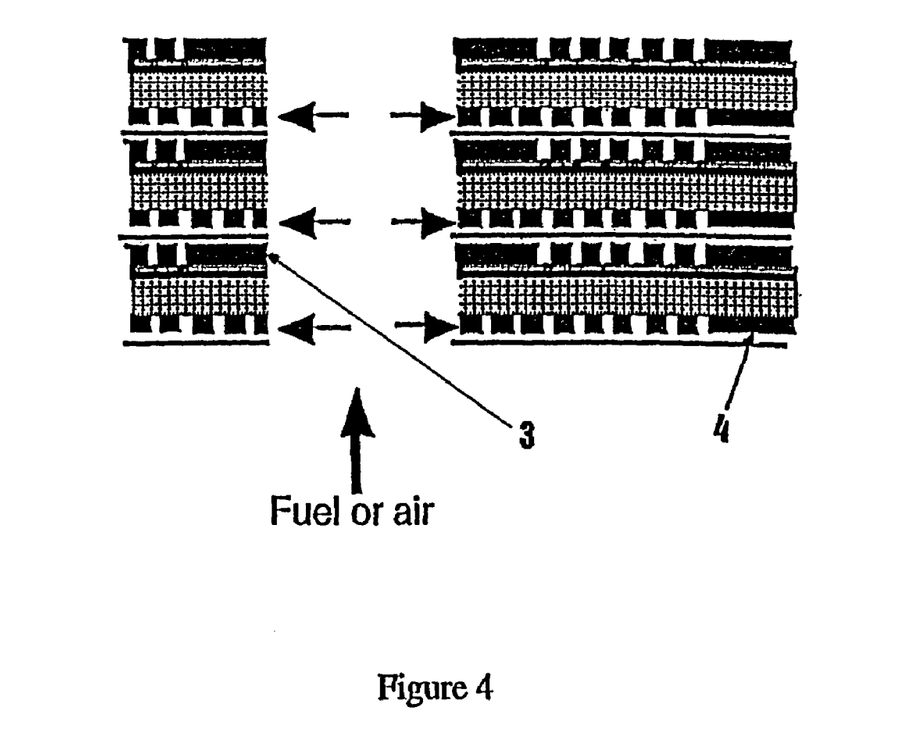
FIG. 4 is a schematic representation, in vertical section, on AA', of the embodiment of FIG. 3.

FIG. 3 shows a schematic view of the rear face of an anode collector layer, the structure of which may correspond either to the layer cca1 of FIG. 1 or to the layer cca2 of FIG. 2. A plurality of bumps 6 are distributed uniformly over the entire surface of the anode collector layer. The latter is pierced by a number of holes. The holes 1 which are located on the right in FIG. 3 are surrounded by lips 3 of the same height as the bumps 6. The holes 2 which are located on the left in the figure are not surrounded in this way. All the layers of a stack have the same holes, arranged so that they lie exactly opposite one another within the stack, as shown in FIG. 4. When a gas is injected through one of the left-hand holes in FIG. 3, it circulates between the bumps of the anode collector layer, diffusing into this layer and into the anode support layer, and escapes through the openings 5 in the open portion of the edging 4 of the rear face of the anode, and is burned. A gas injected through one of the holes 1 located on the right in FIG. 3 cannot reach the rear face of the anode in any substantial quantity because of the lips 3 which surround said holes. Only minimal quantities of gas can escape, on account of the porosity of the material. On the other hand, since the corresponding hole of the rear face of the cathode is not surrounded by a lip, this gas circulates over the corresponding rear face of the cathode.

Figure 9:
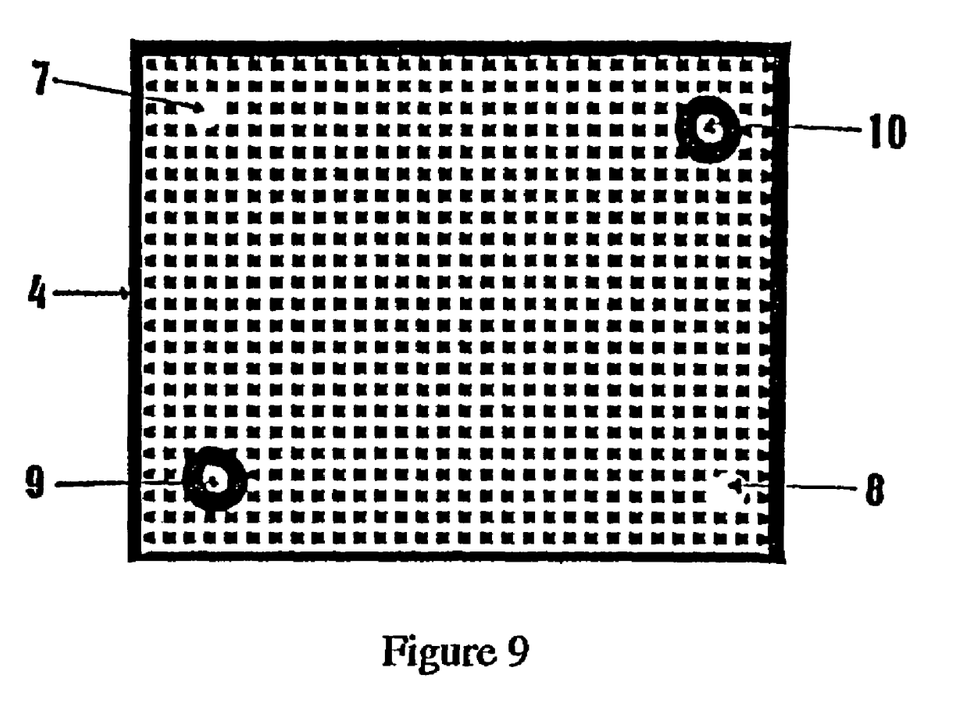
FIG. 9 is a schematic representation, in plan view, of a second embodiment of a rear face of an electrode.

FIG. 9 shows a schematic view of the rear face of an anode collector layer which differs from the embodiment shown in FIG. 3 by the absence of openings in the peripheral edging 4. The gas injected through the hole 7 at the top left of FIG. 9 is evacuated through the hole 8 at the bottom right, or vice versa.

The supply and evacuation of gases on the cathode side takes place in a similar manner through the holes located respectively at the bottom left, 9, and top right, 10, of FIG. 9.

This embodiment does not require lateral tubes; it is thus particularly inexpensive to manufacture.

Figure 8:
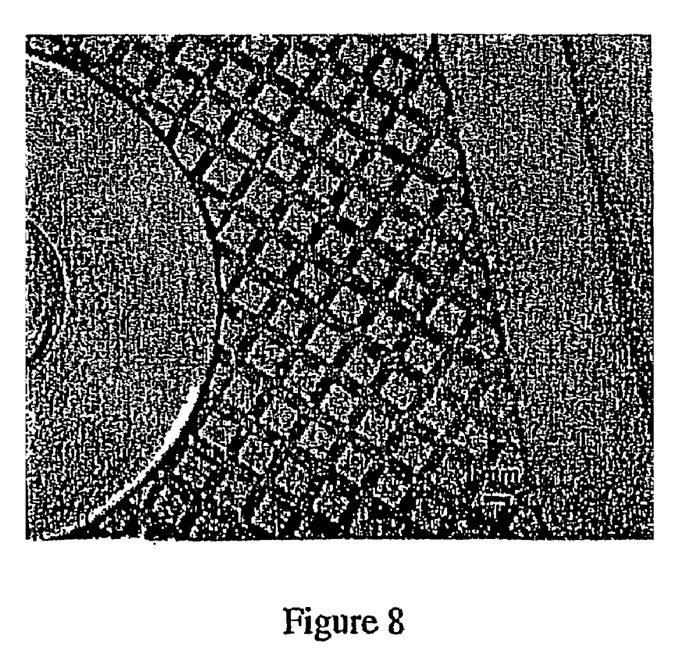
FIG. 8 is a photomicrograph of a portion of a rear face of an anode according to the invention.

FIG. 8 is a photomicrograph of a portion of the anode rear face corresponding to the embodiment shown schematically in FIG. 9. A portion of edging can be seen on the right, a portion of lip on the left and, between the two, a plurality of bumps having approximate dimensions of 1×1×1 mm, the summit surfaces of which are light in color, said bumps being separated by gas circulation channels which are darker in color.

In the embodiment shown in FIG. 8, both the lip and the edging are made of the same ceramic material as the bumps, that is to say of the material of which the rear face of the electrode is made. This embodiment has the advantage of being highly simple but does entail a very slight sealing defect since this material is porous.

In order to perfect the sealing effect of the lips, it is possible to use various shaped pieces:

a washer of the "belleville" type may be used, alone or embedded in the electrode material of which the lip is also made. It is possible to use "belleville" washers made of heat-resistant steel sheet, for example Fe22Cr, with sheet thicknesses of around 5 to 200 μm, in particular 20 to 75 μm. The internal and external diameters of the washers are respectively equal to the internal and external diameters of the lips. In order to produce relatively thick lips, it is possible to stack a number of "belleville" washers on top of one another, or else to weld two "belleville" washers to one another along the edge of their smaller diameters.

it is also possible to use a mica washer, alone or embedded in the electrode material of the lip.

it is also possible to use a very fine metal washer, made of heat-resistant steel or aluminum or aluminum-nickel, in the form of a tube compressed into an accordion shape, as a seal, alone or embedded in the electrode material of the lip.

it is also possible to use under the same conditions a metal foam with a closed porosity.

finally, it is possible to produce a lip consisting of a mixture of electrode materials with a glass powder, or else to use dense ceramic or glass ceramic washers that are embedded in the electrode material of the lip.

In order to improve the sealing effect of the edging 4 shown in FIG. 3 or 9, it is possible:

to arrange strips of mica on the edges of the electrode plate by embedding them or not in the electrode material, to produce the edging from a mixture of electrode materials with a glass powder, to arrange on the edge a dense ceramic or a glass ceramic embedded in the electrode material.

In the embodiments shown in FIGS. 1 to 4, the interfaces between the electrolyte and the electrodes are planar. The same arrangement of the gas distribution channels may be produced in embodiments where the interface between the electrolyte and the electrodes is structured, as shown in FIGS. 5 to 7.

Figure 5:
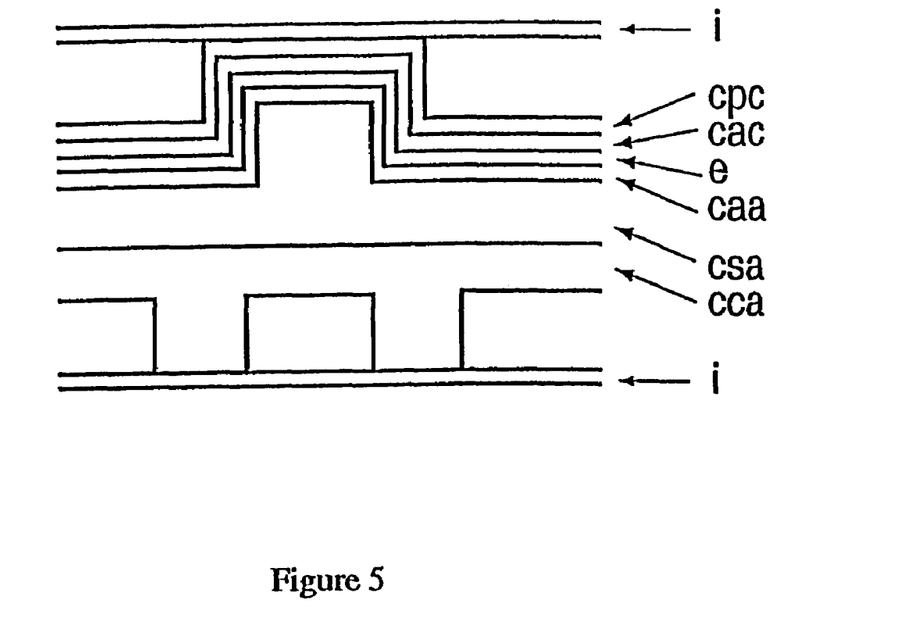
FIG. 5 is a schematic representation, in vertical section, of a third embodiment of a PEN.

FIG. 5 shows, from bottom to top: a planar interconnecting plate i; a structured anode collector layer cca, with a planar front face but having on its rear face bumps which form gas circulation channels; an anode support layer csa, with a planar rear face but having on its front face a raised structure with raised areas in the form of bumps. A succession of thin layers is deposited on this anode support layer, the thickness of each of the thin layers being around a few microns, namely an active anode layer, an electrolyte layer, at least one active cathode layer and, optionally, a second, porous cathode layer. Since the overall thickness of the layers deposited is small compared to the dimensions, heights and thicknesses of the bumps arranged on the front face of the anode support layer, the materials deposited do not fill the spaces between the bumps, and these spaces form gas circulation channels when a second planar interconnecting plate is placed on top of the PEN.

Figure 6:
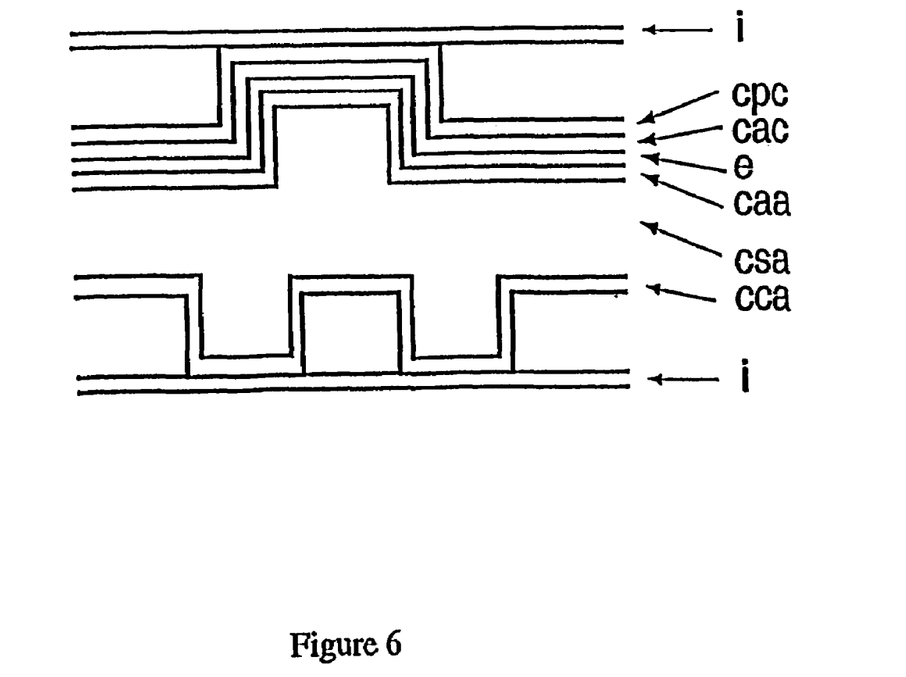
FIG. 6 is a schematic representation, in vertical section, of a fourth embodiment of a PEN.

FIG. 6 shows another embodiment of the PEN according to the invention. It differs from the embodiment shown in FIG. 5 by the fact that the anode support layer is formed of two half-layers, each structured on one face and joined by their smooth faces, using a process described below. A fine anode collector layer may be deposited on the rear face of the anode support layer thus produced. The same layers as in the embodiment shown in FIG. 5 are deposited on the front face of the csa.

Figure 7:
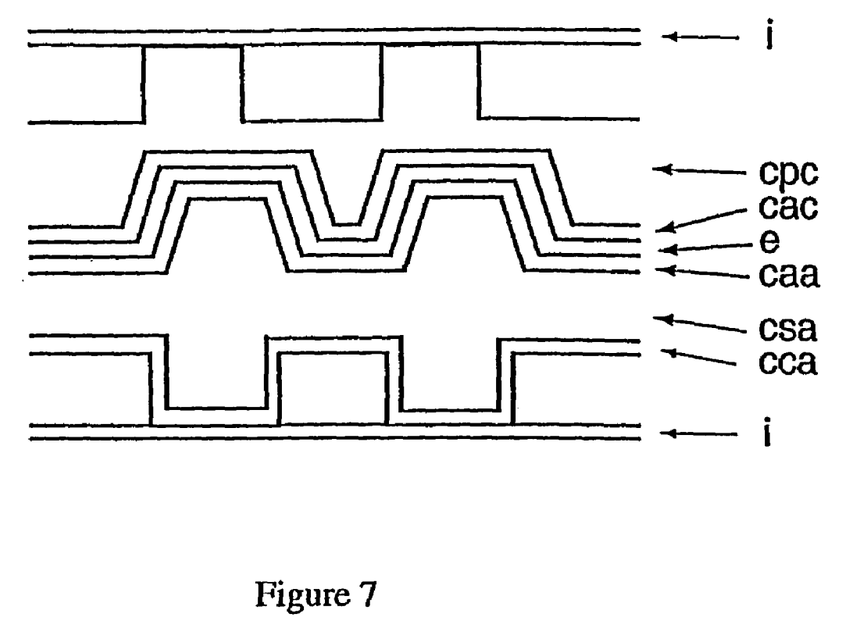
FIG. 7 is a schematic representation, in vertical section, of a fifth embodiment of a PEN.

FIG. 7 shows an embodiment in which the anode support layer also has on its front face an anterior raised structure, on which there are deposited the active anode layer, the electrolyte and the active cathode layer, each formed of thin layers having a thickness of a few μm. In this embodiment, the porous cathode layer is thicker and has on its rear face, which is designed to come into contact with the interconnecting plate i, a raised structure consisting of bumps which form gas circulation channels with said interconnecting plate. It may be noted that in this embodiment, the anterior raised structure of the front face of the anode support layer is independent of the raised structures in the form of bumps of the rear faces of the anode and cathode which form the gas circulation channels. The anterior raised structure of the front face of the anode support layer is designed merely to increase the work surface, that is to say the surface area of the electrolyte/electrodes interface. The geometry may therefore be different from the structures of the rear faces, in particular in terms of the size of the raised elements which may be much smaller than that of the bumps forming the gas channels. The front face of the anode support layer may in this case be microstructured by stamping.

The microstructuring may thus be produced by a micromolding process. This process makes it possible to produce, for example, an electrolyte/electrodes interface with a "chessboard" structure, comprising "high" squares and "low" squares of width L, offset by a height H. The ratio between developed surface and projected surface increases with the ratio H/L. For H=L, the ratio is 3; for H=2L, the ratio is 5; for H=3L, the ratio is 7; and for H=4L, the ratio is 9. In the case where the electrolyte/electrodes interface has a geometry similar to that shown in FIG. 8, the ratio is approximately 3.

The production of the raised structures shown in FIGS. 1 to 7 is shown by the following examples.

EXAMPLES

Example 1

Production of a Mold for Gas Channels

In a first step, a "master" mold is produced which represents as positive the gas distribution channels. This master mold may be produced by micromachining a metal part, for example by means of electroerosion. It may also be produced by a stereolithography process or by a UV LIGA process, these processes being known in the prior art.

In a second step, a liquid rubber (RTV-ME 622, Wacker Silicone) is cast into the master mold. Following polymerization of the rubber, the latter is removed from the master mold. A flexible, negative mold for the gas distribution channels is thus obtained.

Example 2

Production of a Structured Anode Collector Layer, by Polymerization

The layer is formed using zirconia particles (8 YSZ) and nickel oxide particles (60 to 100% with respect to the weight of the zirconia), having a diameter of between 0.2 and 1.5 μm.

The ceramic powders which are intended to form the anode support layer are dispersed in water with the aid of a polyelectrolyte dispersant (Duramax D3005, Rohm and Haas Company). A difunctional acrylate monomer (SR 610, Sartomer, USA) is added to the dispersion, in a proportion of 8 to 15% by weight with respect to the ceramic powders. Just before the dispersion is placed in the mold, a polymerization reaction initiator is added, for example ammonium persulfate and tetramethylenediamine, each in an amount of 0.5% by weight with respect to the weight of the acrylate monomer. The dispersion is placed in the rubber mold, degassed, and the mold is pressed against a smooth anode support layer which has been obtained beforehand by strip casting and sintering, the other face of which anode support layer already bears an electrolyte layer. Following polymerization of the monomer, the rubber mold is removed. The structure collecting the current is now in a solid state and is bonded to the underlying layer, forming the gas distribution channels.

Example 3

Production of a Gas Distribution Structure (Variant)

The process is the same as in Example 2. The polymerization initiator is diethylenetriamine, in an amount of 5% by weight with respect to the monomer.

Example 4

Production of a Structured Anode Support Layer, by Gelling

Ceramic powders of Example 2, to which 20% by volume of $ZrO_2$ fibers having a length of 100 μm and a diameter of 10 μm are added, are dispersed in water with the aid of a polyelectrolyte dispersant (Duramax, D3005, Rohm and Haas). A gelatin (Gelatin Gelia, Stoess AG, Germany) is added to the dispersion in an amount of 5 to 15% by weight with respect to the mass of water, which is heated to a temperature of 50° C. Once the gelatin has dissolved, the dispersion is poured into the rubber mold. The dispersion is degassed, and then the rubber mold is placed on the smooth face of a layer that has been previously molded and sintered. Once the dispersion has cooled to room temperature and left to rest for 24 hours, said dispersion is gelled and the rubber mold may be removed. The raised structure is now in the solid state and bonded to the underlying layer.

Example 5

Production of a Structured Anode Collector Layer with Catalytic Properties

A ceramic powder of the Ni-8YSZ type comprising 45% by weight of Ni is doped with 10% by volume of $CeO_2$ particles comprising 5% catalytic Ni. The mixture is dispersed in water with the aid of a polyelectrolyte dispersant (Duramax, D3005, Rohm and Haas). Agarose (agarose LMP analytical grade, Promega USA) is added to the dispersion (5 to 15% by weight with respect to the mass of water) which is heated. Once the agarose has dissolved, the dispersion is poured into the rubber mold. At this point, the dispersion is degassed, and then the rubber mold is placed on the anode support layer of a flat cell (PEN). Once the dispersion has cooled to room temperature, said dispersion is gelled and the rubber mold may be removed. The gas distribution channels and current collector channels are now in a solid state and attached (bonded) to the cell (PEN).

Example 6

Production of a Structured Anode Collector Layer with Catalytic Properties (Variant)

Ceramic powders of Example 5 are dispersed in water with the aid of a polyelectrolyte dispersant (Duramax, D3005, Rohm and Haas). A gelatin of the cryogel type (Cryogel 220/240, PB Gelatins, Belgium) is added to the dispersion (5 to 15% by weight with respect to the mass of water) which is heated. Once the gelatin has dissolved, the dispersion is poured into the rubber mold. At this point, the dispersion is degassed, and then the rubber mold is placed on the cell. Once the dispersion has cooled to room temperature and been left to rest for 24 hours, said dispersion is gelled and the rubber mold may be removed. The structured layer comprising the gas distribution channels and current collector elements is now in a solid state and attached (bonded) to the cell (PEN).

Example 7

Production of a Porous Cathode Layer by Polymerization

The material used may be LSM ($La_{0.7}Sr_{0.3}MnO_3$) or LSC with a particle size of between 0.2 and 1.5 μm.

Ceramic powders are mixed with a liquid epoxy monomer (Araldite DY-T, Vantico, Switzerland) in an amount of 0.3 to 1 g per gram of ceramic powder. Following homogenization, the curing reagent (Aradur 21, Vantico, Switzerland) is introduced into the paste in an amount of 25% by weight with respect to the weight of epoxy monomer, and the mixture is rehomogenized. The paste is placed in the rubber mold and the latter, following degassing of the paste, is placed on a planar and smooth silicone rubber substrate. Following crosslinking of the epoxy, the raised structure obtained is detached from the rubber mold and from the silicone substrate. This raised structure is inserted between the cathode and the metal interconnecting plate when the stack is assembled.

Example 8

Production of a Raised Structure with Catalytic Properties on an Interconnecting Plate

The operating procedure is the same as in Example 5, except that the rubber mold containing the paste or the dispersion is pressed against the interconnecting plate consisting of a sheet of steel. Following solidification of the paste or dispersion, the raised structure is borne by the interconnecting plate in the raw state. This structure is then placed in contact with a PEN comprising a planar, presintered anode, and the whole is brought to the operating temperature of the cell (700° C. to 800° C.) following assembly of the stack.

Example 9

Production of a Raised Structure Using a Temporary Mold

A bottomless mold, consisting of a grid of polymer material, is placed on a smooth PEN which has previously been sintered. A liquid or pasty dispersion of the same type as in Examples 1 to 4 is deposited on this mold. The dispersion is made to infiltrate the mold and is pressed against the underlying layer by means of a roller. The grid does not need to be removed once the raised structure has been formed, since said grid burns the first time the stack is used at high temperature.

Example 10

Production of a Raised Structure Using a Temporary Mold (Variant)

The start of the procedure of Example 9 is followed, but before the paste is gelled a metal interconnecting plate is deposited on the temporary grid. Following gelling, the interconnecting plate and the PEN are bonded to one another by the gel. They form an element of the stack. The grid will be destroyed upon operation at high temperature.

Example 11

Production of a Structured Electrolyte

A paste or dispersion containing a mixture of nickel oxide powders (40% by weight) and zirconia powder (8 YSZ) is produced in accordance with one of the procedures of Examples 1 to 4. The rubber mold is filled with the dispersion to a height of 0.5 mm. Once the dispersion has solidified, it is removed from the mold and constitutes the anode support in the raw state. On the structured side of the latter there is deposited a layer of paste, composed of zirconia powder (8 YSZ, $0.05 < D50 < 1$ μm), water, dispersant (Duramax D3005) and polymer (Natrosol HEC MR, Aqualon, France). The thickness of the layer of paste above the structure is 50 to 100 μm. Following drying of this paste, the residual layer of zirconia 8 YSZ follows the anode support structure and has a thickness of between 3 and 15 μm. It constitutes the electrolyte. The anode support, covered by this thin layer of zirconia, is placed in an oven and sintered at a temperature of 1400° C. for four hours. Then, a layer of paste, composed of LSM powder ($La_{0.8}Sr_{0.2}MnO_3$, $0.05 < D50 < 2$ μm), water, dispersant (Duramax D3005) and polymer (Natrosol HEC MR), is deposited on the sintered electrolyte. The thickness of the layer of paste above the structure is 50 to 100 μm. Following drying of the latter, the layer of LSM follows the structure of the electrolyte and has a residual thickness of between 3 and 15 μm. The whole is again sintered at 1200° C. for two hours.

Example 12

Production of an Anode Support that is Structured on Both Sides

Two rubber molds are filled with the dispersion in the pasty state to a height of 0.2 to 1 mm. Once the two dispersions have solidified, the two rubber molds are joined on their faces which show the smooth solidified dispersions, after a fine layer of non-solidified dispersion has been deposited between the two faces. When all of the dispersion has made the transition to the solid state, the anode support thus formed in the raw state is removed from the two rubber molds. The thin electrolyte and the thin cathode may then be deposited using the procedure of the preceding example.

Example 13

Production of a Stack

A PEN is produced from an assembly that can be handled, consisting of an active cathode layer, an electrolyte layer, an active anode layer and an anode support layer, all these layers being planar and smooth. The whole is in the form of a disk having a diameter of 120 mm, pierced with holes for the supply and evacuation of gases. An anode collector layer is added to the anode side in accordance with the procedure of Example 4. A porous cathode layer is added to the cathode side in accordance with the procedure of Example 7. 20 to 40 PENs thus produced are stacked in an alternating manner with planar metal interconnecting plates bearing the same holes, and this stack is integrated in a chamber of an SOFC system.

Example 14

Production of a Stack

An anode support which is structured on both sides, the front face being microstructured and bearing an electrolyte layer and an active cathode layer, is produced in accordance with the procedure of Example 12. A porous cathode layer is added above the active cathode layer in accordance with the procedure of Example 7. An anode collector layer is deposited on the rear face of the anode support using a spray gun and drying. The stack is then made as in Example 13.

The raised structures of the electrode faces according to the invention have been shown in the examples and in the figures by bumps in the form of parallelepiped rectangles. The person skilled in the art will readily understand that other shapes—cylindrical, hexagonal, pyramidal, etc.—may be used while performing the same functions, namely circulating the fuel and oxidizing gases and increasing the reactive surface area of the electrolyte/electrode interface.

The invention claimed is:

1. A positive electrode-electrolyte-negative electrode-assembly for a solid oxide fuel cell (SOFC PEN) with a cathode, said cathode comprising a porous cathode layer and an active cathode layer, with an anode, said anode comprising three distinct continuous layers, each of these layers forming a single, continuous structure, said anode layers comprising an active anode layer, an anode support layer, and an anode collector layer, said anode support layer constituting the mechanical support of the PEN, and with at least one electrolyte layer, said electrolyte layer being placed between said active anode and cathode layers, wherein said anode collector layer covers the rear face of the anode support layer, and wherein the anode collector layer presents, on its rear face which is designed to come into contact with an interconnecting plate, a raised structure which is chosen so as to form gas circulation channels with said interconnecting plate, and wherein said cathode also has, on its rear face which is designed to come into contact with an interconnecting plate a raised structure which is chosen so as to form gas circulation channels with said interconnecting plate, and in that the raised structures of the anode and of the cathode each comprise a plurality of prominent bumps which are spaced apart from one another, wherein summit surfaces of the bumps of the anode are substantially coplanar and parallel to summit surfaces of the bumps of the cathode, the latter likewise being coplanar with one another.

2. The SOFC PEN as claimed in claim 1, comprising at least one first hole and at least one second hole passing axially through it, in that the raised structure of the rear face of the anode comprises at least one first lip that surrounds said first hole, and in that the raised structure of the rear face of the cathode comprises at least one second lip that surrounds said second hole, said first hole not being surrounded by a said second lip and said second hole not being surrounded by a said first lip.

3. The SOFC PEN as claimed in claim 2, wherein the raised structures of the respective rear faces of the cathode and anode each comprise an edging that surrounds each rear face, each capable of forming, in collaboration with an interconnecting plate, a chamber that is sealed except on an open portion of said edging.

4. The SOFC PEN as claimed in claim 2, comprising at least four axial holes and in that the raised structures of the rear faces of the anode and cathode each have an edging that respectively surrounds said rear faces, and at least one inlet hole and one outlet hole for each of the fuel and oxidizing gases respectively.

5. The SOFC PEN as claimed in claim 1, wherein the front face of the anode on the electrolyte side also has a raised structure.

6. The SOFC PEN as claimed in claim 5, wherein the anode support layer has a raised structure on its front face, in that the active anode layer has a thickness of 1-20 □m, the electrolyte has a thickness of 3-20 □m and the active cathode layer has a thickness of 1-20 □m, wherein said active anode layer, the electrolyte and active cathode layer cover said raised structure of said front face, and in that the raised structure of said front face of the anode support layer is chosen so that the rear face of the cathode can form gas circulation channels with an interconnecting plate with which it comes into contact.

7. The SOFC PEN as claimed in claim 6, wherein the structure of the front face of the anode support layer is obtained by a molding process and in that the thin layers are obtained by a deposition process.

8. The SOFC PEN as claimed in claim 6, wherein said raised structure of the front face of the anode comprises a plurality of bumps having a height of between 0.2 and 2 mm, and in that the distance between the flanks of neighboring bumps is between 0.1 and 2 mm.

9. The SOFC PEN as claimed in claim 5, wherein the anode support layer has an anterior raised structure on its front face, in that the active anode layer, the electrolyte and the active cathode layer consist of thin layers, and in that the porous cathode layer has, on its rear face which is designed to come into contact with an interconnecting plate, a raised structure which is chosen so as to form gas circulation channels with said interconnecting plate.

10. The SOFC PEN as claimed in claim 9, wherein said anterior raised structure of the front face of the anode support layer is obtained by stamping.

11. The SOFC PEN as claimed in claim 9, wherein said anterior raised structure of the front face of the anode support layer is obtained by a micromolding process.

12. The SOFC PEN as claimed in claim 11, wherein said anterior raised structure of the front face of the anode support layer is obtained by micromolding and gelling.

13. The SOFC PEN as claimed in claim 9, wherein the height of the raised elements of said anterior raised structure is between 0.1 and 2 mm and in that the distance between neighboring elements is between 50 µm and 2 mm.

14. The SOFC PEN as claimed in claim 5, wherein the ratio between the height and the thickness of the elements of the raised structure of the front face of the anode is between 1 and 4.

15. The SOFC PEN as claimed in claim 5, wherein the anode is obtained by joining a smooth rear face of the anode support layer to a smooth front face of the anode collector layer.

16. The SOFC PEN as claimed in claim 5, wherein the raised structures of the front faces and/or rear faces of the anode and cathode are obtained by molding.

17. The SOFC PEN as claimed in claim 1, wherein the material of the anode support layer and/or anode collector layer comprises fibers selected from ceramic fibers and metal fibers.

18. The SOFC PEN as claimed in claim 17, wherein the proportion of said fibers is from 20 to 40% by volume, and in particular from 25 to 35% with respect to the total volume.

19. The SOFC PEN as claimed in claim 1, wherein the material of the porous cathode layer comprises fibers selected from ceramic fibers.

20. The SOFC PEN as claimed in claim 17, wherein the diameter (d) of said fibers is between 1 and 50 µm and the a ratio L/d, wherein L stands for the length of the fibers, is between 2 and 30.

21. The SOFC PEN as claimed in claim 19, wherein a diameter (d) of said fibers is between 1 and 50 µm and a ratio L/d, wherein L stands for the length of the fibers, is between 2 and 30.

22. The SOFC PEN as claimed in claim 1, wherein the material of the anode support layer and/or anode collector layer comprises a reforming catalyst selected from Ni deposited on ceramic particles, NiCu deposited on ceramic particles, chromites, $CeO_2$, and mixtures thereof.

23. The SOFC PEN as claimed claim 22, wherein the amount of catalyst is between 5 and 15% by volume of the material of the anode.

24. The SOFC PEN as claimed in claim 1, wherein the front face of the anode on the electrolyte side also comprises raised structures, wherein the raised structures of the front faces and/or rear faces of the anode and cathode are obtained by micromolding and gelling.

25. The SOFC PEN as claimed in claim 1, wherein the material of the porous cathode layer comprises fibers selected from strontium-doped lanthanum manganate (LSM) fibers, strontium-doped lanthanum cobaltate (LSC) fibers and lanthanum ferrocobaltates.

26. The SOFC PEN as claimed in claim 1, wherein the material of the anode support layer and/or anode collector layer comprises fibers selected from ceramic fibers and metal fibers, and wherein the diameter (d) of said fibers is between 2 and 30 µm and a ratio L/d, where L stands for the length of the fibers, is between 5 and 25.

27. The SOFC PEN as claimed in claim 1, wherein the material of the anode support layer and/or anode collector layer comprises fibers selected from ceramic fibers and metal fibers, and wherein the diameter (d) of said fibers is between 5 and 15 µm and a ratio L/d, where L stands for the length of the fibers, is between 8 and 20.

28. The SOFC PEN as claimed in claim 1, wherein the material of the porous cathode layer comprises fibers selected from ceramic fibers, and wherein the diameter (d) of said fibers is between 2 and 30 µm and a ratio L/d, where L stands for the length of the fibers, is between 5 and 25.

29. The SOFC PEN as claimed in claim 1, wherein the material of the porous cathode layer comprises fibers selected from ceramic fibers, and wherein the diameter (d) of said fibers is between 5 and 15 μm and a ratio L/d, where L stands for the length of the fibers, is between 8 and 20.

30. The SOFC PEN as claimed in claim 1, wherein the front face of the anode on the electrolyte side also comprises raised structures, wherein the raised structures of the front faces and/or rear faces of the anode and cathode are obtained by stamping.

31. An SOFC stack, comprising a plurality of PENs as claimed in claim 2 and interconnecting plates, in an alternating manner, wherein each of said interconnecting plates is a smooth and planar plate provided with holes that are coincident with the holes of the PENs, as seen in the stacking axis.

32. A positive electrode-electrolyte-negative electrode-assembly for a solid oxide fuel cell (SOFC PEN) with a cathode, said cathode comprising a porous cathode layer and an active cathode layer, with an anode, said anode comprising three distinct continuous layers, each of these layers forming a single, continuous structure, said anode layers comprising an active anode layer, an anode support layer, and an anode collector layer, said anode support layer constituting the mechanical support of the PEN, and with at least one electrolyte layer, said electrolyte layer being placed between said active anode and cathode layers, wherein said anode collector layer covers the rear face of the anode support layer, and wherein the anode collector layer presents, on its rear face which is designed to come into contact with an interconnecting plate, a raised structure which is chosen so as to form gas circulation channels with said interconnecting plate, and wherein the front face of the anode on the electrolyte side also has a raised structure.

* * * * *

UNITED STATES PATENT AND TRADEMARK OFFICE
CERTIFICATE OF CORRECTION

PATENT NO. : 7,632,586 B2 Page 1 of 1
APPLICATION NO. : 10/500515
DATED : December 15, 2009
INVENTOR(S) : Ihringer et al.

It is certified that error appears in the above-identified patent and that said Letters Patent is hereby corrected as shown below:

Column 7, line 15, delete "C," and insert in lieu thereof --C--.
Column 8, line 2, delete "10%" and insert in lieu thereof --1%--.
Column 8, line 57, delete "C." and insert in lieu thereof --C--.
Column 8, line 58, delete "C." and insert in lieu thereof --C--.
Column 9, line 4, delete "C." and insert in lieu thereof --C--.
Column 15, line 2, delete "C." and insert in lieu thereof --C--.
Column 15, line 49, delete "C." and insert in lieu thereof --C--.
Column 15, line 57, delete "C." and insert in lieu thereof --C--.
Claim 1, Column 16, line 63, delete "interconnecting a plate a" and insert in lieu thereof
--interconnecting plate, a--.

Signed and Sealed this

Twenty-seventh Day of April, 2010

David J. Kappos
*Director of the United States Patent and Trademark Office*